United States Patent [19]

Masai

[11] 4,325,650
[45] Apr. 20, 1982

[54] CONNECTION MEANS FOR COOLING FAN ASSEMBLIES

[75] Inventor: Hiroto Masai, Toyota, Japan

[73] Assignee: Aisin Seiki Kabushiki Kaisha, Kariya, Japan

[21] Appl. No.: 199,008

[22] Filed: Oct. 20, 1980

[30] Foreign Application Priority Data

Oct. 26, 1979 [JP] Japan .................... 54-149214[U]

[51] Int. Cl.³ .............................................. F16D 3/66
[52] U.S. Cl. .................................. 403/372; 267/161; 416/244 R
[58] Field of Search ................ 267/161, 163; 403/372; 308/2 A; 64/1 V; 416/132 A, 240 R, DIG. 3, 60, 204 R, 244 R

[56] References Cited

U.S. PATENT DOCUMENTS 2,690,529 9/1954 Lindblad ..................... 267/161 X
3,089,342 5/1963 Willis ........................ 267/163 X

FOREIGN PATENT DOCUMENTS 2016649 9/1979 United Kingdom .

Primary Examiner—Andrew V. Kundrat
Attorney, Agent, or Firm—Finnegan, Henderson, Farabow, Garrett

[57] ABSTRACT

Connection means for cooling fan assemblies are used to connect the fan assemblies to drive means such as viscous fluid couplings. The connection means includes a generally annular plate spring which has projections extending radially inward of an annular base and tongues projecting radially inwardly from the base. Each of the tongues is provided with a circumferential extension axially deformable and at the tip with an enlarged portion. The enlarged tip portions are secured to a casing of the drive means and the projections and the tongues are secured to a boss of the fan assembly with bolts. The arrangement that the projections, the tongues and the circumferential extensions are disposed inside of the base and the projections and the tongues are secured to the fan assembly serves to decrease vibration of the fan assembly and to increase the durability of the connection means.

3 Claims, 2 Drawing Figures

CONNECTION MEANS FOR COOLING FAN ASSEMBLIES

The present invention relates to connection means for cooling fan assemblies.

The cooling fan is generally mounted on a casing of the drive means such as a viscous fluid coupling by use of the connection means. The connection means includes an axially resiliently deformable plate spring and is interposed between a boss of the fan assembly and the casing of the fluid coupling to compensate for any misalignment arising when the fan assembly is eccentrically mounted on the fluid coupling with respect to an axis of a driving shaft. The plate spring has an annular base, tongues extending radially outward of the base, and extensions each circumferentially projecting from the tongue. In this case, the tongues are secured to the casing of the fluid coupling by bolts and the extensions are secured at the tip to the boss of fan assembly by bolts. However, since the extensions extend radially outward of the base, the base has a tendency to be subjected to vibration and also has problems as to durability.

Therefore, the object of the present invention is to provide connection means for cooling fan assemblies which overcome the above-mentioned disadvantages in the prior arts.

According to the present invention, there is provided connection means for cooling fan assemblies each including a plate spring made of a single metal plate, the plate spring comprising an annular base, a plurality of projections extending radially inward of the base, a plurality of tongues projecting radially inwardly from the base, and circumferential extensions axially resiliently deformable and each projecting from the tongue and having an enlarged tip portion, respectively, the projections, the tongues and the enlarged tip portions being provided with holes through which bolts pass.

The other objects and advantages of the present invention will become apparent from the following description of a preferred embodiment with reference to the accompanying drawings, in which.

Figure 1:
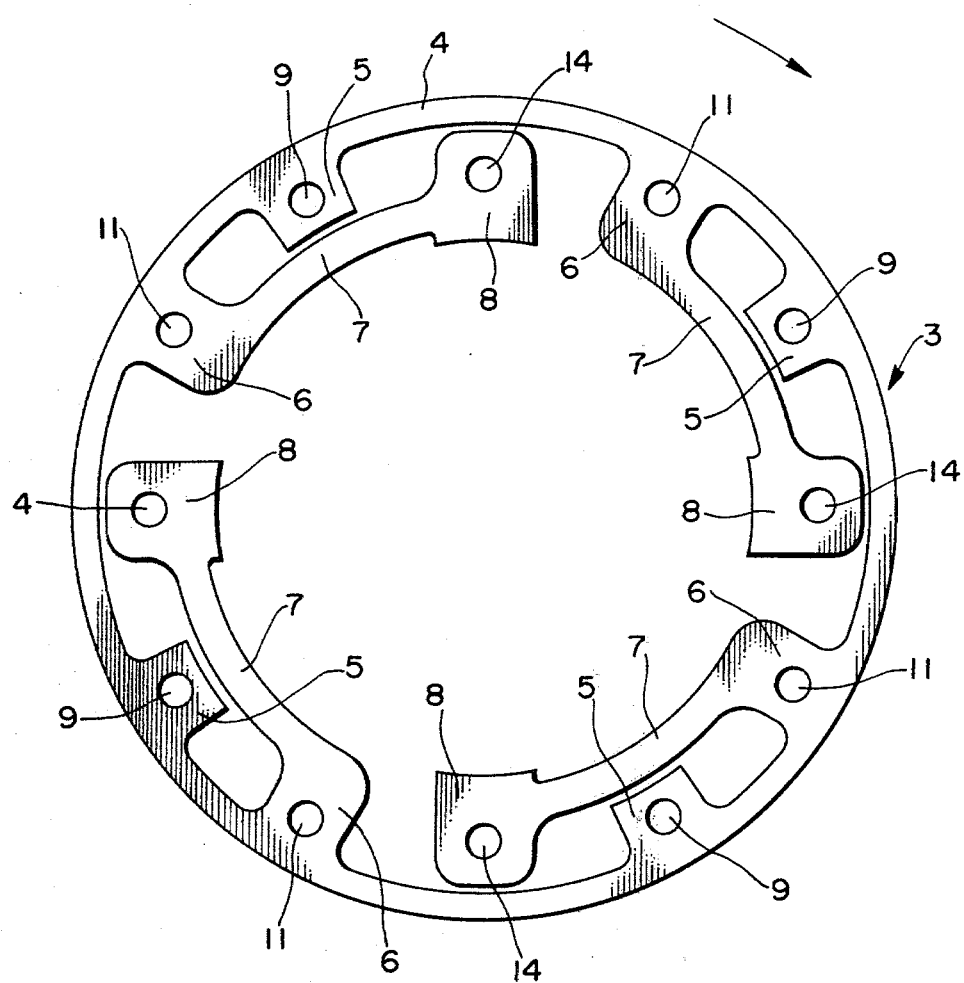
FIG. 1 is a front view of connection means for fan assembly.
Figure 2:
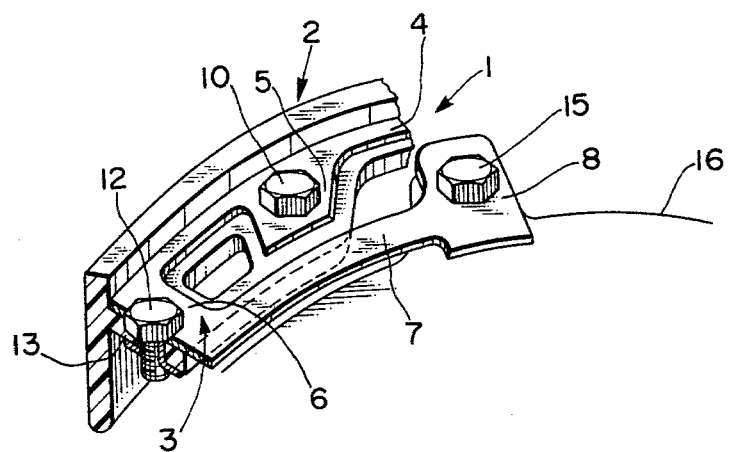
FIG. 2 is a fragmentary view showing how to connect the fan assembly to a fluid coupling.

A connection means (1) for a cooling fan assembly (2) suitable for vehicle engine includes a generally annular plate spring (3). The plate spring (3) made of a sole metal plate comprises an annular base (4), four projections (5) extending radially inward of the base (4), four tongues (6) projecting radially inwardly from the base (4) and arranged between every two consecutive tongues (6), and circumferential extensions (7) axially resiliently deformable and each projecting from an individual tongue (6) and having an enlarged tip portion (8).

Each of the projections (5) is provided with a hole (9) through which a bolt (10) passes and also each of the tongues (6) is located between the neighbouring projections (5) and provided with a hole (11) through which a bolt (12) passes to secure the plate spring (3) to a boss (13) of the cooling fan assembly (2).

Each of the enlarged tip portions (8) of the circumferential extensions (7) is provided with a hole (14) through which a bolt (15) passes to secure the plate spring (3) to a rotatable casing (16) of a viscous fluid coupling. The plate spring (3) is rotated in the direction as indicated by an arrow.

The connection means for the cooling fan assembly has the projections and the tongues both extending radially inward of the annular base, and the circumferential extensions disposed inside of the annular base and projecting the tongues. The projections and the tongues are secured to the boss of the fan assembly and the tip portions of the circumferential extensions which are axially deflectable are secured to the rotatable casing of the fluid coupling. These arrangements prevent the base of the plate spring from being vibrated so that the life span of the spring plate may be prolonged and a smooth rotation of the cooling fan assembly may be obtained.

I claim:

1. A connection means for a cooling fan assembly including a plate spring made of a single metal plate, said plate spring comprising an annular base, a plurality of projections extending radially inward of said base, said projections being distributed around said base, a plurality of tongues projecting radially inwardly from said base, and circumferential extensions axially resiliently deformable and each projecting from an individual one of said tongues and having an enlarged tip portion, said projections, said tongues and said tip portions being provided with holes through which bolts pass, respectively.

2. A connection means for a cooling fan assembly according to claim 1, wherein the holes of said enlarged tip portions are used to connect said plate spring to a casing of a fluid coupling and the holes of said projections and said tongues are used to connect said plate spring to a boss of the fan assembly.

3. A connection means for a cooling fan assembly according to claim 2, wherein each of said tongues is located between neighboring ones of said projections.

* * * * *